United States Patent [19]

May

[11] Patent Number: 4,851,130

[45] Date of Patent: Jul. 25, 1989

[54] OXYGEN REMOVAL WITH CARBON CATALYZED ERYTHORBATE OR ASCORBATE

[75] Inventor: Ralph D. May, Oakdale, Conn.

[73] Assignee: Pfizer Inc., New York, N.Y.

[21] Appl. No.: 278,127

[22] Filed: Nov. 30, 1988

[51] Int. Cl.$^4$ .................... C02F 1/20; C23F 11/10
[52] U.S. Cl. .................... 210/750; 210/757; 210/766; 422/17; 252/178
[58] Field of Search ............ 210/668, 669, 694, 750, 210/757, 763, 765, 766; 422/13, 14, 16, 17; 252/178, 390–404

[56] References Cited

U.S. PATENT DOCUMENTS

| | | | |
|---|---|---|---|
| 4,230,595 | 10/1980 | Yamaji et al. | 252/400.1 |
| 4,419,327 | 12/1983 | Kelly et al. | 422/17 |
| 4,549,968 | 10/1985 | Muccitelli | 210/750 |
| 4,556,492 | 12/1985 | Dickerson et al. | 210/668 |
| 4,627,921 | 12/1986 | Meyers et al. | 210/668 |
| 4,629,571 | 12/1986 | Salem et al. | 210/668 |
| 4,676,910 | 6/1987 | Dubin | 210/750 X |
| 4,681,737 | 7/1987 | Walker et al. | 422/16 |
| 4,784,778 | 11/1988 | Shin | 252/400.1 X |

FOREIGN PATENT DOCUMENTS

| | | |
|---|---|---|
| 1168950 | 6/1984 | Canada . |
| 1186425 | 4/1985 | Canada . |
| 2117369 | 10/1983 | United Kingdom . |

*Primary Examiner*—Tom Wyse
*Attorney, Agent, or Firm*—Peter C. Richardson; Paul H. Ginsburg; Gezina Holtrust

[57] ABSTRACT

When an aqueous system containing dissolved oxygen and erythorbate or ascorbate is passed through an activated carbon bed, the oxygen is removed at ambient temperatures. This method of oxygen removal finds practical application in the removal of oxygen from boiler condensate, low temperature boiler feedwater and oil well injection water or brine.

10 Claims, 1 Drawing Sheet

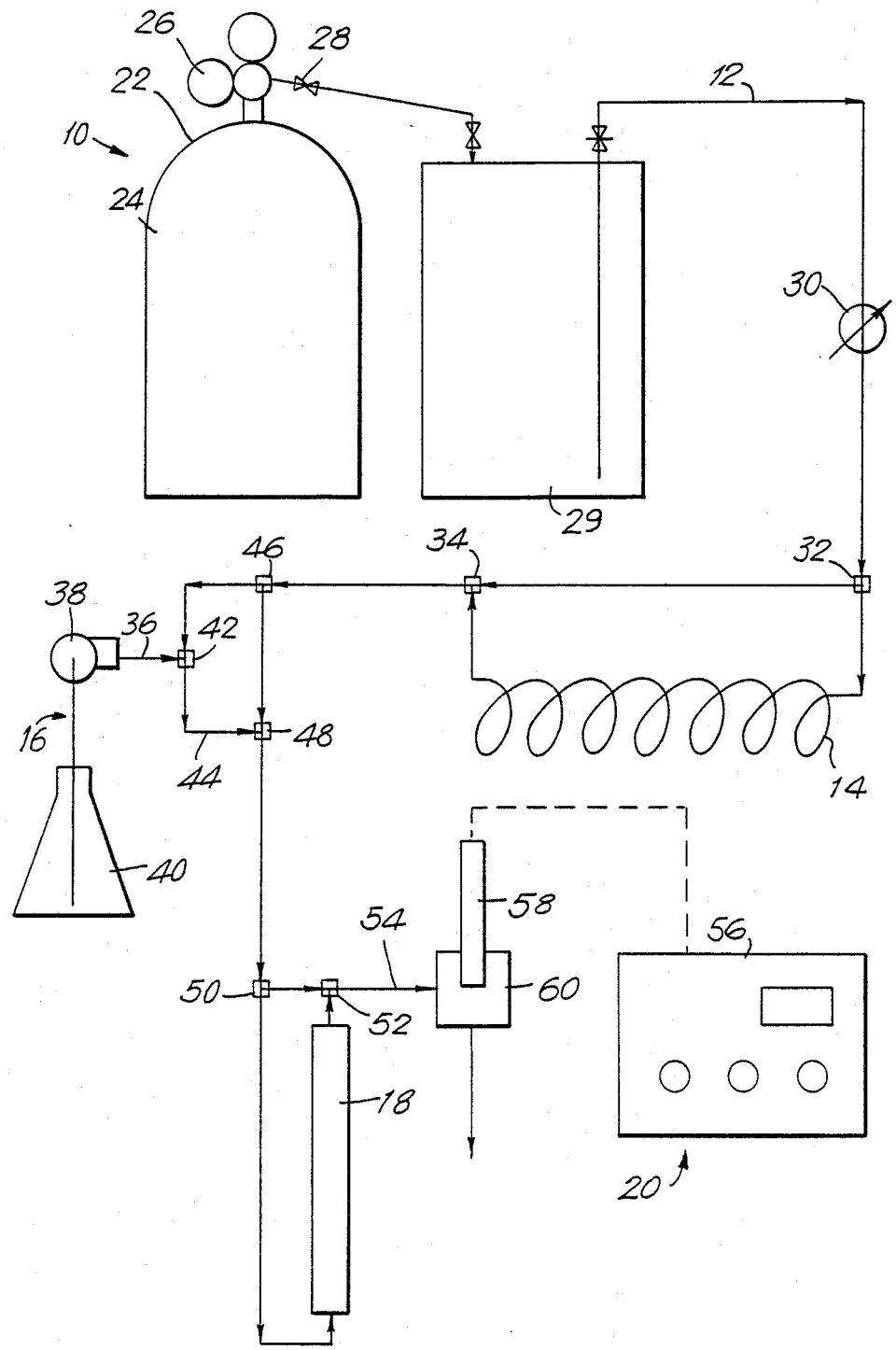

OXYGEN REMOVAL WITH CARBON CATALYZED ERYTHORBATE OR ASCORBATE

BACKGROUND OF THE INVENTION

This invention relates to the removal of oxygen from aqueous system such as boiler feedwater and oil well injection water. Such oxygen removal is achieved with erythorbic acid, erythorbate, ascorbic acid, or ascorbate, with the aid of activated carbon.

The use of erythorbic acid as an oxygen remover or scavenger in boiler feedwater is described in Kelly et al U.S. Pat. No. 4,419,327. At the high temperatures and pressures of the boiler system, erythorbic acid is capable of reacting with oxygen very rapidly in the absence of activated carbon. At ambient temperature, however, erythorbic acid reacts too slowly to be of practical value.

Meyers et al U.S. Pat. No. 4,627,921 discloses deoxygenation of water at ambient temperature by passing the water with a reducing agent such as hydrazine, morpholine, sodium sulfite, and sodium acid sulfite through an adsorbent, absorbent bed which may be made of activated carbon. The present invention introduces further oxygen scavengers having advantages not attained with the above four reducing agents of Meyers et al.

SUMMARY OF THE INVENTION

According to the invention, dissolved oxygen is removed from an aqueous system by contacting said aqueous oxygen-containing system with an oxygen scavenger selected from the group consisting of erythorbic acid, erythorbate, ascorbic acid, and ascorbate, and with activated carbon.

The oxygen-containing system may be contacted with the oxygen-scavenger in the presence of the activated carbon on the system may be contacted with the oxygen-scavenger before contact with the activated carbon. Preferably, the oxygen-containing system is first contacted with a solution of the oxygen scavenger before contacting with the activated carbon.

Generally, the pH of the aqueous system ranges from about 5 to about 9.5. Examples of aqueous systems from which dissolved oxygen may be removed are oil well injection brine, oil well injection water, boiler condensate, and low temperature boiler feedwater.

BRIEF DESCRIPTION OF THE DRAWING

The FIGURE of the drawing shows an apparatus for testing carbon catalyzed oxygen scavinging.

DETAILED DESCRIPTION OF THE INVENTION

The amount of oxygen scavenger needed for oxygen removal from an aqueous system depends on parameters such as the amount of oxygen present in the aqueous system, and the type of scavenger used. In general, the amount of oxygen scavenger ranges from about 10 to 15 parts per part of oxygen in the system.

The present oxygen scavengers are effective in aqueous systems having ambient or slightly lower than ambient temperatures, e.g. about 39° F. (4° C.) to 149° F. (65° C.), and higher. Ambient temperature is understood to be the temperature at the reaction site. The present method is therefore useful in boiler feedwater usually having low temperatures of at most 180° F. (82° C.), usually at most 150° F. (66° C.), and in oil well injection water or brine having ambient temperatures.

The present method is effective at the usual pH of about 8 to 9.5 of boiler feedwater, and the usual pH of about 5 to 9.5 of oil well injection water. Thus, the pH conditions may vary from about slightly acidic to slightly alkaline. In comparison, the sulfite currently used in boiler feedwater and oil well injection brine or water requires a pH of about 7 to 8 for effective oxygen removal.

Preferably, the oxygen scavenger is a soluble salt of erythorbic acid such as ammonium, sodium, potassium, calcium or zinc erythorbate. Sodium erythorbate monohydrate is particularly suitable since it is commercially available. A soluble salt of ascorbic acid is less preferred because of the higher cost thereof.

The present oxygen scavengers are effective at the high temperatures of oil field applications and boiler systems. In comparison, sulfite can not be used in systems that operate under pressures of higher than about 1,000 psi.

The activated carbon of use in the present method is capable of promoting the reaction of oxygen with one of the oxygen scavengers of the invention at the above mentioned relatively low temperatures. The activated carbon is in general a carbon having a large surface area. The efficiency of the active carbon decreases with increasing size of the carbon particles, so longer residence times are required with beds of larger particle sizes, and shorter residence times with beds of smaller particle sizes. Larger carbon particles of e.g. about 5 mm, form less efficient scavengers because of the smaller total surface available for catalyzing the reaction. However, the particle size should not be so small, e.g. about 100 mesh, as to cause washing away of the particles during use. Advantageously, the The following Examples illustrate the invention. The temperatures are in degrees Celsius.

EXAMPLES 1–5

The drawing shows an experimental apparatus used to simulate the conditions of the aqueous systems, oxygen concentration etc. in practical application of the invention. System 10 comprising six components: a gas regulator 11, a reservoir and delivery system for water 12, a cooling coil 14, a delivery system for erythorbate 16, a carbon bed 18, and an oxygen analyzer 20.

The gas regulator 22 consists of a cylinder of compressed helium 24, a pressure regulator 26, and an on/-off valve 28.

The reservoir and delivery system 12 consists of a tank 29. The tank is pressurized with compressed helium at 10 p.s.i.g. to drive the water contained in the tanks through the treatment system 10. The flow rate of the water if regulated by a metering valve 30.

The cooling coil 14 is contained in a plastic pail (not shown) which is filled with ice and water. Most experiments do not require cooling and the cooling coil is then bypassed using three-way valves 32 and 34.

The erythorbate solution is fed through outlet 36 using a metering pump 38. The erythorbate solution is formed by dissolving sodium erythorbate in deoxygenated water in an erlenmeyer flask 40 and the solution is protected by a nitrogen blanket. The solution is pumped to a mixing tee 42 in injection loop 44. When the solution is not fed into the system, the injection loop 44 is bypassed by using three-way valves 46 and 48.

The carbon bed 18 consists of a cylinder of packed active carbon. The aqueous system exiting from three-way valve 48 flows upward through the carbon bed facilitating flushing of gas bubbles from the aqueous system. The carbon bed 18 may be bypassed using three-way valves 50 and 52.

The oxygen content of the aqueous system in line 54 is measured by the oxygen analyzer 20 (Orbisphere model 2713) consisting of a meter 56, a probe 58, and a flow cell 60. The analyzer 20 can measure 0.1 ppb dissolved oxygen at temperatures of 0 to 45° C. and flow rates of 50 to 250 ml/min.

The Table sets forth the results of five experiments

Comparative Example 1A shows the effect of omitting the active carbon bed of Example 1 on the amount of oxygen scavenged. Comparative Example 1B shows the effect of omitting the sodium erythorbate of Example 1. The remaining Examples show the use of both the oxygen scavenger and the active carbon bed under different reaction conditions. Example 2 shows scavenging of a brine at a relatively short reaction time. Example 3 shows scavenging with a carbon bed of relatively small particle size and relatively small bed size. Example 4 shows scavenging of a brine having a low initial oxygen concentration at a low temperature.

TABLE

| | Sodium Erythorbate Concentration | Oxygen Concentration initial | Oxygen Concentration final | Reaction Time* | Temperature | Carbon Bed Dimensions (diameter by length) | Carbon Type | Aqueous System | Flow Rate |
|---|---|---|---|---|---|---|---|---|---|
| EXAMPLE 1 | 162 ppm | 8.9 ppm | 0.4 ppm | 6 min. | 20° C. | 4" × 15" | Darco 12 × 20 | water | 450 ml/min |
| EXAMPLE 1A | 162 ppm | 12 ppm | 10.7 ppm | 6 min. | 20° C. | | no carbon | water | 450 ml/min |
| EXAMPLE 1B | 0 | 12 ppm | 11.9 ppm | 6 min. | 20° C. | 4" × 15" | Darco 12 × 20 | water | 450 ml/min |
| EXAMPLE 2 | 162 ppm | 12 ppm | 1.2 ppb | 2.25 min | 21° C. | 2" × 12" | Darco 12 × 20 | brine | 200 ml/min |
| EXAMPLE 3 | 108 ppm | 8 ppm | 1-2 ppb | 50 sec | 21° C. | 2" × 4" | Darco 20 × 40 | water | 200 ml/min |
| EXAMPLE 4 | 9.1 ppm | 675 ppb | 1.2 ppb | 2.25 min | 4° C. | 2" × 12" | Darco 12 × 20 | brine | 200 ml/min |

*The reaction time is the liquid volume of the carbon bed divided by the flow rate.

with oxygen scavinging of water or brine. The brine solution is a synthetic North Sea brine solution prepared from the following:
24.8 g calcium chloride
215.2 g magnesium chloride hexahydrate
85.8 g sodium sulfate
4.2 g sodium bicarbonate
476.8 g sodium chloride The above was dissolved in water to make 20 liters. The amount of oxygen present in the aqueous systems in the tank varies depending on whether tap water is used having a relatively high oxygen concentration of about 8–12 parts per million (ppm) or oxygenated boiler condensate having lower oxygen concentrations of 675 and 713 parts per billion (ppb).

The particle size specifications of the activated carbon are as follows:

| 12 × 20 | 20 × 40 |
|---|---|
| >10 mesh - 3% max. | >18 mesh - 3% max. |
| >12 mesh - 10% max. | >20 mesh - 10% max. |
| <20 mesh - 5% max. | <40 mesh - 5% max. |

The mesh sizes are standard U.S. sieve sizes corresponding to the following openings:

| mesh | opening |
|---|---|
| 10 | 2.00 mm |
| 12 | 1.68 mm |
| 18 | 1.00 mm |
| 20 | 0.84 mm |
| 40 | 0.42 mm |

I claim:

1. A method of removing dissolved oxygen from an aqueous system comprising contacting said aqueous oxygen-containing system with an oxygen scavenger selected from the group consisting of erythorbic acid, erythorbate, ascorbic acid, ascorbate, and with activated carbon.

2. A method according to claim 1 wherein said contacting with said oxygen scavenger is in the presence of said activated carbon.

3. A method according to claim 1 wherein said contacting with said activated carbon is after said contacting with said oxygen-scavenger.

4. A method according to claim 1 wherein said aqueous system is an oil well injection water or oil well injection brine.

5. A method according to claim 1 wherein said aqueous system has a pH of about 5 to about 9.5.

6. A method according to claim 1 wherein said oxygen scavenger is erythorbic acid or sodium erythorbate.

7. A method according to claim 1 wherein said contacting is at temperatures of from about 4° C. to about 65° C. (149° F.).

8. A method according to claim 1 wherein said oxygen scavenger is dissolved in water before being added to said aqueous oxygen-containing solution.

9. A method according to claim 1 wherein said oxygen-scavenger is present in amounts of about 10 to 15 parts of erythorbic acid or erythorbate per part of oxygen contained in said aqueous oxygen-containing system.

10. A method according to claim 1 wherein said aqueous system is boiler condensate or low temperature boiler feedwater.

* * * * *